(12) United States Patent
Kawamura et al.

(10) Patent No.: US 7,333,959 B2
(45) Date of Patent: Feb. 19, 2008

(54) APPARATUS AND METHOD FOR BALLOT TICKET PRICE CALCULATION

(75) Inventors: Yuya Kawamura, Nagoya (JP); Akio Sogabe, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 1152 days.

(21) Appl. No.: 09/797,733

(22) Filed: Mar. 5, 2001

(65) Prior Publication Data

US 2002/0032666 A1   Mar. 14, 2002

(30) Foreign Application Priority Data

Sep. 13, 2000   (JP) .............................. 2000-277935

(51) Int. Cl.
*G06F 17/00*   (2006.01)
(52) U.S. Cl. .................................................. 705/400
(58) Field of Classification Search .............. 705/1.14, 705/26, 400, 27, 37, 1, 14
See application file for complete search history.

(56) References Cited

U.S. PATENT DOCUMENTS

| | | | | |
|---|---|---|---|---|
| 4,962,950 A | * | 10/1990 | Champion | 283/67 |
| 5,377,095 A | * | 12/1994 | Maeda et al. | 705/10 |
| 6,049,778 A | * | 4/2000 | Walker et al. | 705/14 |
| 6,101,484 A | * | 8/2000 | Halbert et al. | 705/26 |
| 6,186,502 B1 | * | 2/2001 | Perkins | 273/138.1 |
| 6,269,343 B1 | * | 7/2001 | Pallakoff | 705/26 |
| 6,321,212 B1 | * | 11/2001 | Lange | 705/36 R |
| 6,606,608 B1 | * | 8/2003 | Bezos et al. | 705/37 |
| 6,963,854 B1 | * | 11/2005 | Boyd et al. | 705/37 |
| 2001/0036858 A1 | * | 11/2001 | McNutt et al. | 463/25 |
| 2002/0116348 A1 | * | 8/2002 | Phillips et al. | 705/400 |
| 2003/0126040 A1 | * | 7/2003 | Mesaros | 705/26 |
| 2004/0049470 A1 | * | 3/2004 | Ouimet | 705/400 |

FOREIGN PATENT DOCUMENTS

JP   2004-62301 A   * 2/2004

* cited by examiner

*Primary Examiner*—John W. Hayes
*Assistant Examiner*—Rutao Wu
(74) *Attorney, Agent, or Firm*—Staas & Halsey LLP (57) ABSTRACT

In the selling price calculation apparatus the request receiving unit receives from the purchaser information concerning the ballot tickets the purchaser wants to purchase. The sales information acquisition unit acquires from the discount DB information concerning the ballot tickets. The sales information includes the accumulated number of purchasers and the predicted number of purchasers. The discount rate calculation unit calculates the accuracy of statistical odds based upon the accumulated number of purchasers and the predicted number of purchasers, and calculates the discount rate based upon the accuracy of statistical odds. The selling price calculation unit calculates the selling price of the ballot tickets based upon the discount rate. The problem that the sale of pre-sale ballot tickets becomes concentrated immediately before the time of stopping the sales of the ballot tickets is relieved or solved by a series of processes thereof.

7 Claims, 9 Drawing Sheets

| RACE ID | STANDARD UNIT PRICE | LOWEST UNIT PRICE | PREDICTED NUMBER OF PURCHASERS | ACCUMULATED NUMBER OF PURCHASERS | DATE AND TIME OF STARTING THE SALES OF THE BALLOT TICKETS | DATE AND TIME OF STOPPING THE SALES OF THE BALLOT TICKETS |
|---|---|---|---|---|---|---|
| 1 | 100 | 80 | 900,000 ⇐ | 540,000 | 2000, 07, 01 15:00 | 2000, 07, 03 15:35 |

FOR EXAMPLE, THE SAME RACE AS THAT OF THE PREVIOUS YEAR IS USED.

APPARATUS AND METHOD FOR BALLOT TICKET PRICE CALCULATION

BACKGROUND OF THE INVENTION

1. Field of the Invention

This invention relates to a system that calculates the selling price of presale ballot tickets for which a dividend is paid based upon statistical odds.

2. Description of the Related Art

Various kinds of gambling activities such as horse racing, bicycle racing, dog racing and competitive soccer lot are available. In these gambling activities, ballot tickets are sold before the race or the game begins, and the individuals participating in the gambling activities predict the results of the race or the game and purchase ballot tickets based upon their prediction of the results. If the predicted results coincides with the actual results, the individuals who make such predictions receive a refund of the ballot tickets. The refund is executed based upon the statistical odds (the success rate of refund).

The statistical odds are fixed at the time the sales of the ballot tickets are stopped. Consequently, the nearer the time of purchasing the ballot tickets is to the stopping of the sales of the ballot tickets, the higher the accuracy of the statistical odds. In fact, many people who purchase ballot tickets try to obtain as much information as possible up until the moment the sales of the ballot tickets are stopped so as to predict the results of the race or the game more accurately. Therefore, this gives rise to such a problem that the purchase of ballot tickets becomes concentrated just before the time the sales of the ballot tickets are stopped.

Figure 1:
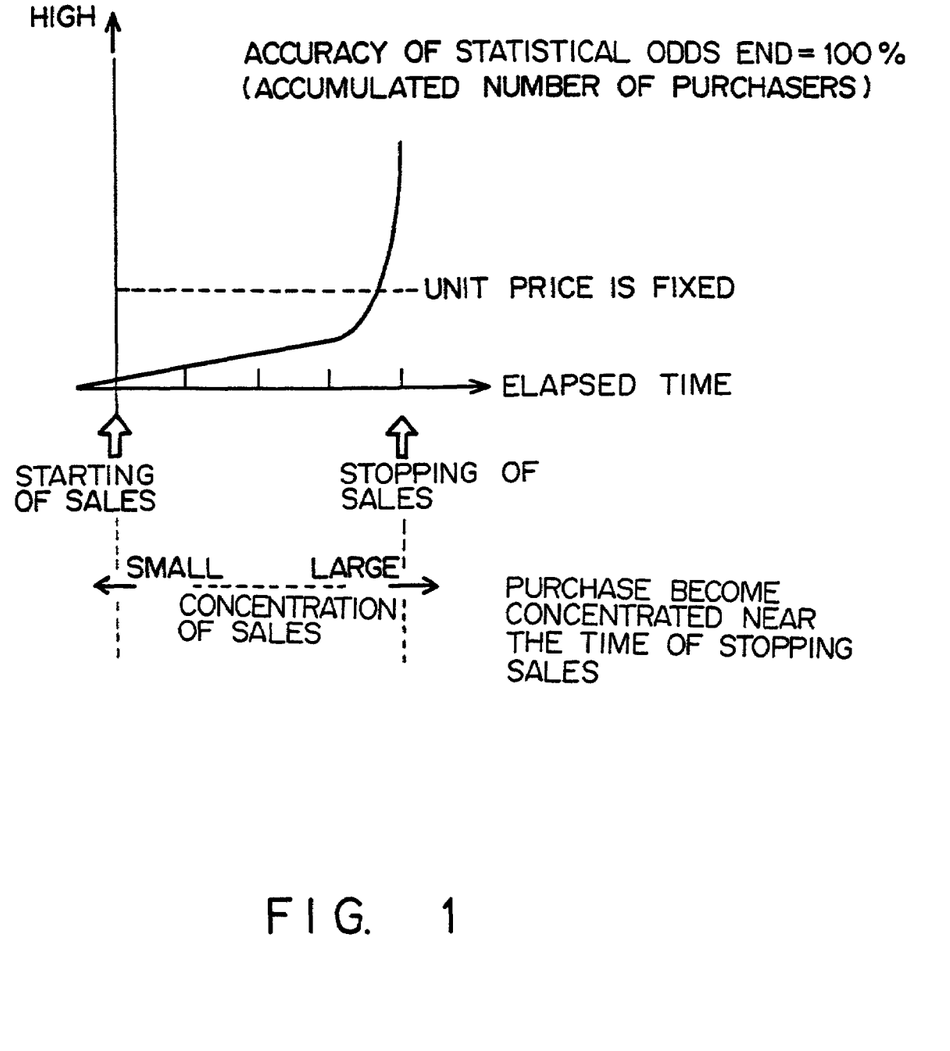
FIG. 1 is a diagram showing the relationships between time and accuracy of statistical odds and between time and accuracy of statistical odds and the unit selling price, which apply to a conventional method.

FIG. 1 shows the relationships between time and accuracy of statistical odds, and between time and the unit price of a ballot ticket. The accuracy of statistical odds is lowest at the time the sales of the ballot tickets begin, gradually becomes higher, sharply rises at about the time the sales of ballot tickets are stopped and reaches the peak at the moment sales of the ballot tickets are stopped, as shown in FIG. 1. In the case of horse racing, for example, the accuracy of statistical odds is about 30 percent about 15 minute before the sales are stopped, and sharply rises at a later time than 15 minutes before the sales are stopped, then becomes 100 percent at the time the sales are stopped. This means that the sales of ballot tickets is concentrated for 15 minutes before the sales are stopped. However, the unit price of a ballot ticket is fixed regardless of the lapse of time.

Since purchasers of ballot tickets tend to collect information up to the time near to the time the sales of the ballot tickets are stopped and the unit price of a ballot ticket is always fixed, it is not disadvantageous for them to delay their purchase. It is for this reason that many of the purchasers of ballot tickets delay their purchase of ballot tickets up until the time near to the time sales are stopped, thus resulting in the sales of ballot tickets being concentrated just before the moment sales are stopped.

SUMMARY OF THE INVENTION

In view of the above-mentioned problem, the purpose of this invention is to make it possible to relieve the concentration of sales of ballot tickets at the time near to stopping sales of the ballot tickets.

This invention is useful for selling presale ballot tickets, particularly for selling ballot tickets for which a dividend is paid based upon the statistical odds.

As one embodiment of this invention a selling price calculation apparatus that calculates the selling price of a ballot ticket comprises a discount rate calculation unit that calculates the discount rate based upon an accuracy of the statistical odds of the ballot ticket and a selling price calculation unit that calculates the selling price of the ballot ticket based upon the calculated discount rate.

It is thereby possible to calculate a discounted selling price based upon the accuracy of the statistical odds. It also becomes possible to relieve such a problem that the purchase of ballot tickets becomes concentrated at the time of stopping sales because the selling price is discounted if the ballot tickets are purchased at an earlier time than at the time near to the time sales are stopped when the accuracy of the statistical odds is high.

In the above-mentioned configuration, the discount rate calculation unit may calculate the accuracy of statistical odds based upon the predicted number of purchasers and the number of purchasers who have made purchased from the time when sales of the ballot tickets started. There is an empirical rule stating that the accuracy of statistical odds is proportional to the accumulated number of purchasers. It is possible from this empirical rule to calculate the accuracy of statistical odds based upon the predicted number of purchasers and the accumulated number of purchasers.

In the above-mentioned configuration, the selling price calculation apparatus may further comprise a ticket issuance processing unit which issues the ballot ticket to the purchaser when a purchaser designates his or her purchase of ballot ticket at the selling price that is calculated by the selling price calculation unit.

It is also possible to add both a transmitting unit that transmits information which identifies ballot ticket and a receiving unit that receives the selling price of the identified ballot ticket, which is calculated based upon the current accuracy of statistical odds, in the user's terminal connected via a network to the selling price calculation apparatus in the above-mentioned configuration. The user is thereby able to obtain the selling price of ballot tickets which is discounted based upon the accuracy of the statistical odds.

It is also possible to add an accumulated purchaser number calculation unit that calculates the number of purchasers who have been accumulated from the time sales of ballot tickets started, a transmitting unit that transmits the accumulated number of purchasers to the selling price calculation apparatus and a receiving unit that receives information about the ballot tickets issued at the selling price that is calculated based upon the accuracy of the statistical odds from the selling price calculation apparatus, in order to calculate the accuracy of the statistical odds of ballot tickets in the server that sends and receives information about ballot tickets, connected to the selling price calculation apparatus in the above-mentioned configuration via a network.

As another embodiment of the invention, a method for calculating the selling price of a ballot ticket may comprise calculating a discount rate based upon an accuracy of statistical odds of the ballot ticket and calculating selling price of the ballot ticket based upon the calculated discount rate. The above-mentioned problem can be solved by this method.

In this case, it is possible to obtain the selling price of the ballot tickets via a network by transmitting information that identifies the ballot tickets and receiving the selling price of the ballot tickets which is calculated based upon the current accuracy of the statistical odds, at the user's terminal.

In addition, the above-mentioned problem can also be solved by making a computer read and execute the program from the computer readable recording medium that records the program by which the computer executes the same control as the functions executed by each configuration unit mentioned above.

BRIEF DESCRIPTION OF THE DRAWINGS

The features and advantages of the present invention will be more clearly appreciated from the following description and in conjunction with the accompanying drawings in which like elements are denoted by like reference numerals and in which.

DESCRIPTION OF THE PREFERRED EMBODIMENT

Described below is the mode for executing this invention using the diagrams. Please note that a common reference number is attached to the instrument or the unit, and explanations about them are omitted. Also, please note that horse racing is used as an example of a gambling activity to explain the mode for executing the invention, but this invention is not limited to horse racing.

Figure 2:
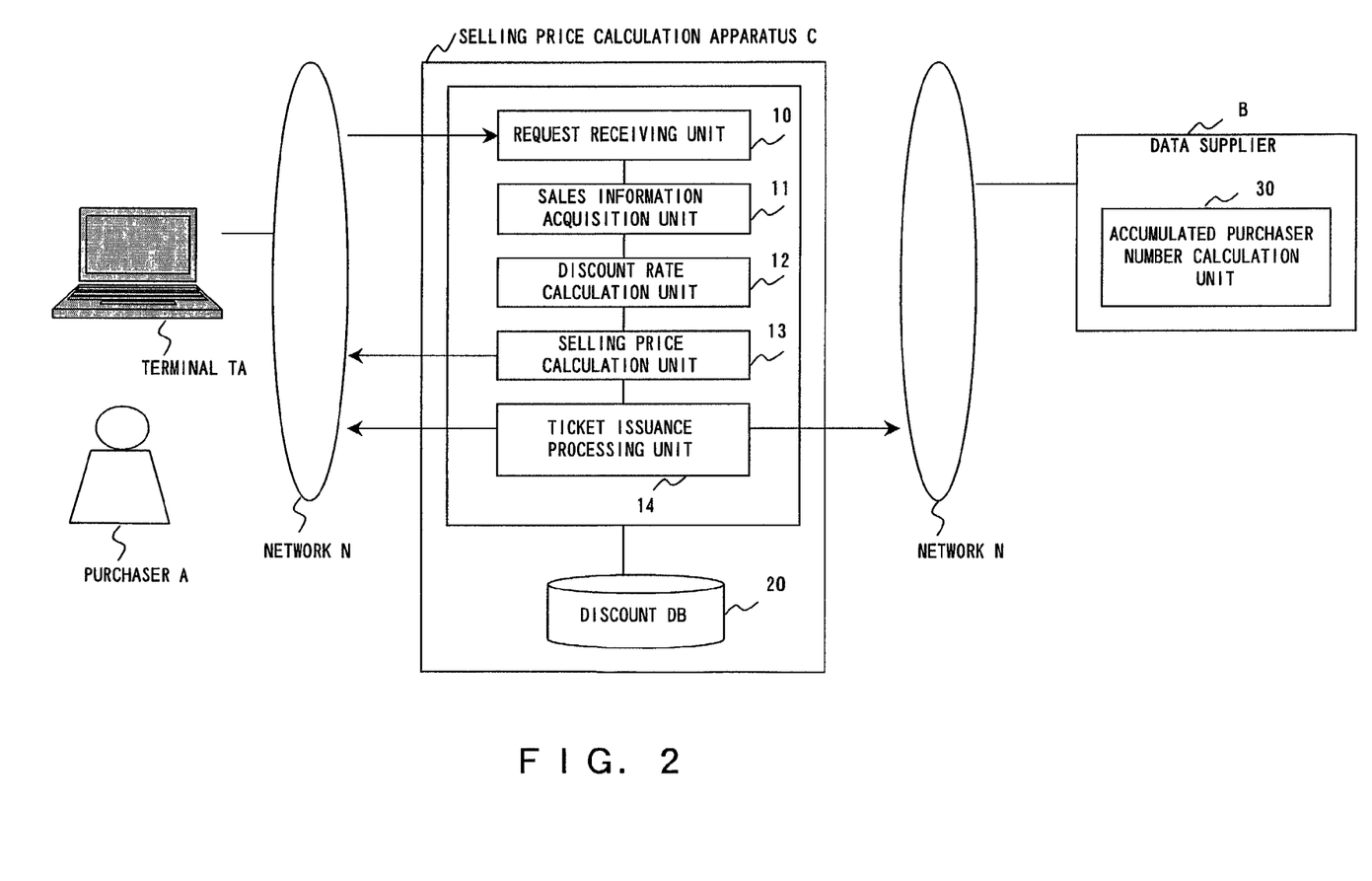
FIG. 2 is a diagram showing the configuration of the selling price calculation apparatus according to the embodiment of the invention.

FIG. 2 shows the configuration of the ballot ticket selling price calculation system according to the embodiment of the present invention. The terminal TA, the data supplier B and the ballot ticket selling price calculation apparatus C are connected via the network N, as shown in FIG. 2. The network N can be one network or a combination of plurality of networks. A WAN (Wide Area Network) such as the Internet, a telephone line and a wireless circuit network etc. and a LAN (Local Area Network) can be used as the network N.

The terminal TA performs the processing related to the sale of ballot tickets. Considered as the terminal TA are, for example, the ballot ticket selling machine, the terminal at the location of selling ballot tickets, or an information terminal owned by the purchaser A. The information terminal owned by the purchaser A can be a portable information terminal such as a cellular phone and a portable computer. When the processing related to the sale of ballot tickets is executed by the terminal owned by the purchaser A, it is conceivable to use, for example, the PAT (Personal Access Terminal) system provided by the Japan Racing Association and a text information service for cellular phones such as I-mode (registered trademark of NTTDoCoMo). Please note that these are only examples, and do not limit the invention to the cited examples.

The data supplier B provides the selling price calculation apparatus C with the predicted number of purchasers, the date and time of starting sales of ballot tickets, the date and time of stopping sales of ballot tickets, the standard unit price of ballot tickets and the lowest unit price, with regard to each race. The data supplier B also has the accumulated purchaser number calculation unit 30. The accumulated purchaser number calculation unit 30 receives information on ballot ticket issuance at any time from the selling price calculation apparatus C or from the terminal that executes the processing related to the issuance of ballot tickets, and calculates the accumulated number of purchasers based upon the received information on the issuance of ballot tickets.

The selling price calculation apparatus C calculates the selling price of pre-sale ballot tickets. The selling price calculation apparatus C comprises the request receiving unit 10, the sales information acquisition unit 11, the discount rate calculation unit 12, the selling price calculation unit 13, the ticket issuance processing unit 14 and the discount database 20 (hereinafter a database is called as a DB).

The request receiving unit 10 receives the request for selling ballot tickets from the terminal TA via the network N. The sales information acquisition unit 11 acquires from the discount DB 20 the sales information concerning the requested race or the requested game (hereinafter called race) based upon the request received from the terminal TA. The acquired information is, for example, the standard unit price of ballot tickets of the race, the lowest unit price, the predicted number of purchasers, the accumulated number of purchasers at the present time, the date and time of starting sales of ballot tickets, and the date and time of stopping sales of ballot tickets. Here, the information stored in the discount DB 20, for instance, is provided by the data supplier B in advance of the race or at any time, and is updated. The organizer of the race, etc., can be considered as the data supplier B The discount rate calculation unit 12 calculates the discount rate of the selling price of ballot tickets based upon the sales information acquired by the sales information acquisition unit 11. To be more specific, the discount rate calculation unit 12 calculates the discount rate by using the accumulated number of purchasers and the predicted number of purchasers in the sales information obtained by the sales information acquisition unit 11. The selling price calculation unit 13 calculates the requested selling price of ballot tickets based upon the sales information obtained by the sales information acquisition unit 11 and the discount rate calculated by the discount rate calculation unit. To be more specific, the selling price is calculated based upon the standard unit price and the lowest unit price from the sales information acquired by the sales information acquisition unit 11 as is also based upon the discount rate calculated by the discount rate calculation unit 12.

When the purchaser A decides to purchase ballot tickets, the ticket issuance processing unit 14 processes the issuance of ballot tickets to the purchaser A based upon the selling price calculated by the selling price calculation unit 13, and informs the data supplier B of the contents of the ticket issuance.

Figure 3:
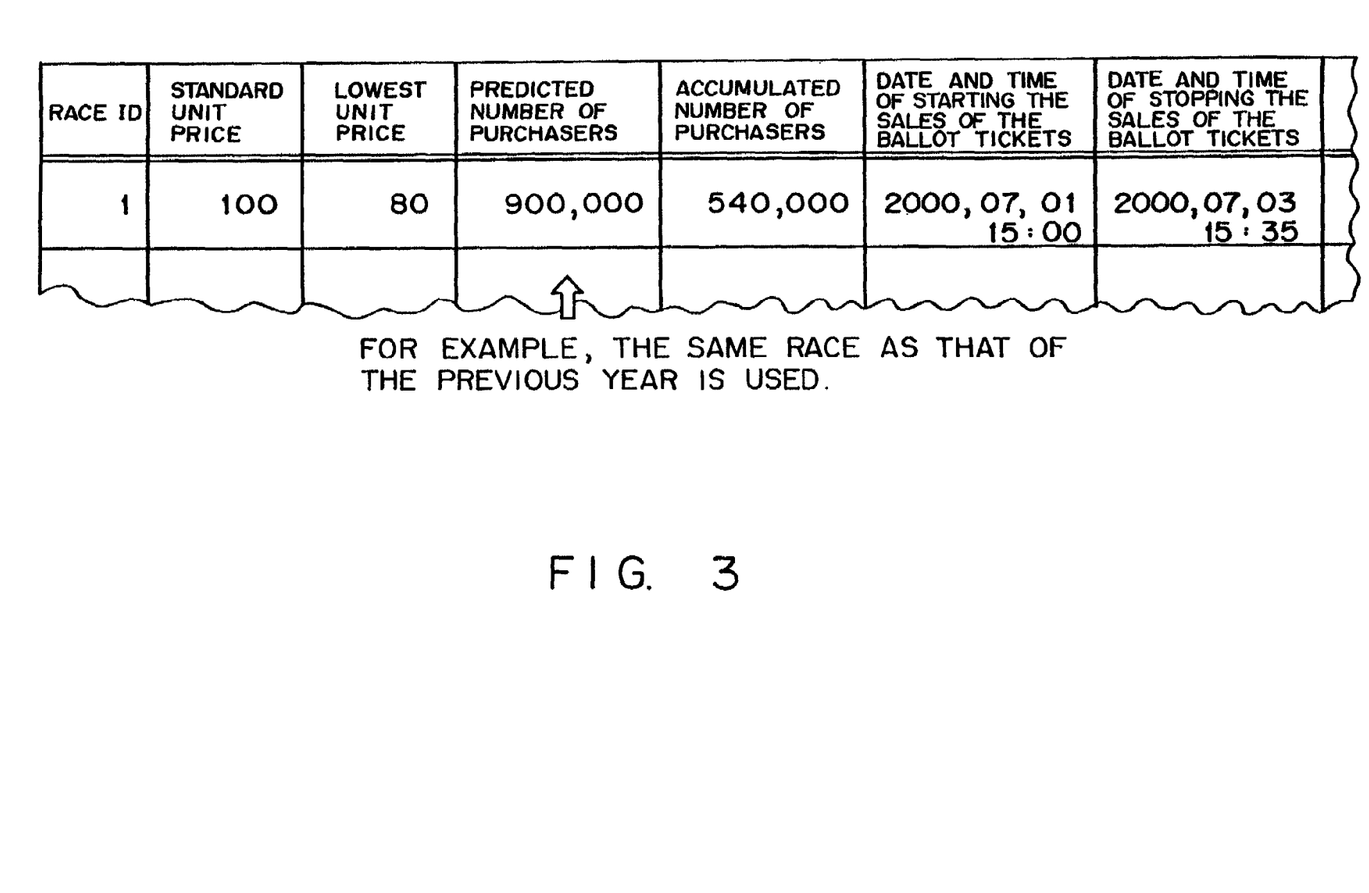
FIG. 3 is a diagram showing an example of the data structure of the discount database.

There is an empirical rule stating that the accuracy of the statistical odds is proportional to the accumulated number of purchasers. In this invention, the discount rate is calculated based upon the accumulated number of purchasers and the predicted number of purchasers, and the selling price is calculated based upon the said discount rate. Here, the fewer the number of accumulated purchaser, i.e. the less accurate the statistical odds, the larger the discount rate calculated by the discount rate calculation unit 12. This makes it possible to discount the selling price of ballot tickets if the accuracy of the statistical odds is low when a purchaser requests the purchase of ballot tickets. If the accuracy of the statistical odds is low or if the time is not immediately before the time of stopping the sales of ballot tickets, the purchaser can purchase ballot tickets at a low selling price, so that the number of purchasers who intend to purchase at a low price by purchasing at an early time increases, thus making it possible to relieve or solve such a problem that ticket sales become concentrated immediately before the time of stopping the sales of ballot tickets The database structure of the discount DB is described below using the diagram of FIG. 3. The discount DB 20 stores sales information that is information about the sales of ballot tickets. The discount DB 20 stores the race ID (Identification information) that identifies each race, the standard unit price of ballot tickets, the lowest unit price, the predicted number of purchasers, the accumulated number of purchasers, the date and time of starting sales of ballot tickets and the date and time of stopping sales of ballot tickets. These pieces of information are based upon the information provided by the data supplier B, etc. Here, information other than the accumulated number of purchasers is stored in the discount DB 20 before the time of beginning to sell ballot tickets for the race or at the same time as that of beginning to sell ballot tickets. The accumulated number of purchasers is stored after the time of beginning to sell ballot tickets and is continually updated. The predicted number of purchasers is determined based upon, for instance, the actual number of purchasers in the same race of the previous year.

Figure 4:
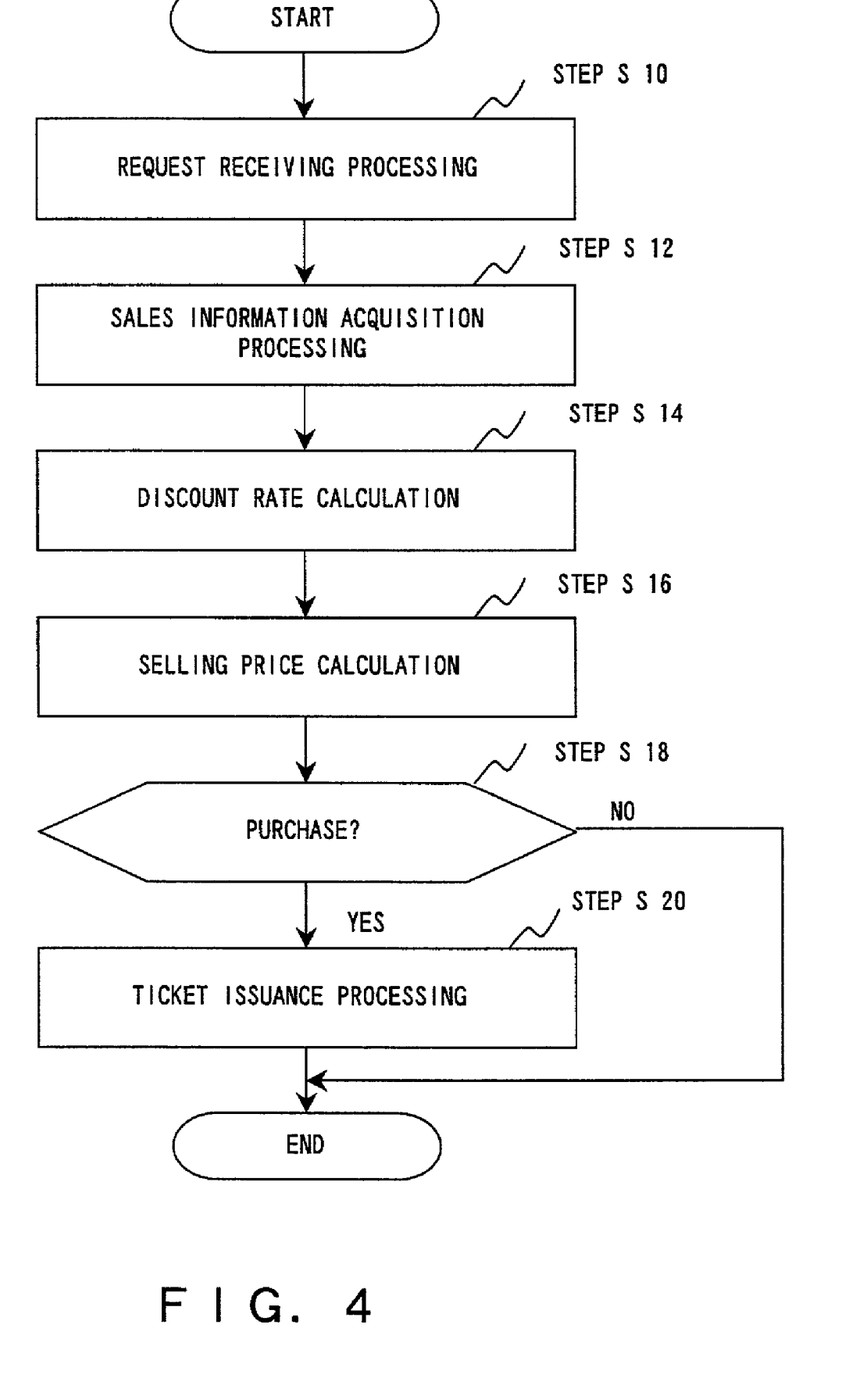
FIG. 4 is a flowchart showing the processes that are performed by the selling price calculation apparatus.

FIG. 4 is a flowchart of the processing that is executed by the selling price calculation apparatus. First, the request receiving unit 10 in the selling price calculation apparatus C starts sales of the ballot tickets of the race at the specified date and time stored in the discount DB 20, and receives a request for purchasing ballot tickets from the terminal TA (Step S10). Included in the request is information such as race ID, kinds and quantity of ballot tickets desired. The sales information acquisition unit 11 acquires sales information about the race by referring to the discount DB 20 using the race ID as a search key. Considered as the sales information to be obtained are the standard unit price, lowest unit price, predicted number of purchasers and accumulated number of purchasers (Step S12).

The discount rate calculation unit 12 calculates the discount rate in accordance with the accuracy of the statistical odds using the sales information obtained by the sales information acquisition unit 11 (Step S14). To be more specific, the discount rate calculation unit 12 calculates the discount rate by deducting from 1 the result obtained by dividing the accumulated number of purchasers by the predicted number of purchasers. For example, when the predicted number of purchasers is 900,000 and the accumulated number of purchasers is 540,000, $$1-540{,}000/900{,}000=0.40$$

is obtained. Therefore, the discount rate is 0.40. This result is based upon the empirical rule stating that the accuracy of statistical odds is proportional to the accumulated number of purchasers. That is, if the number of purchasers of the ballot tickets meets the predicted number, the result obtained by dividing the accumulated number of purchasers by the predicted number of purchasers matches the accuracy of the statistical odds.

However, if the accumulated number of purchasers is larger than the predicted number of purchasers, the discount rate of 0.0 is given so that the unit selling price does not exceed the standard unit price. The selling price calculation unit 13 calculates the selling price based upon the sales information obtained by the sales information acquisition unit 11 and the discount rate calculated by the discount rate calculation unit 12 (Step S16). To be more specific, the selling price calculation unit 13 calculates the selling price by multiplying the discount rate by the difference between the standard unit price and the lowest unit price and then by deducting the result from the standard unit price. For instance, if the standard unit price is 100, the lowest unit price is 80, and the discount rate is 0.40, the selling price is obtained by the following equation.

Selling price=(standard unit price)−{(standard unit price)−(lowest unit price)}×(discount rate)
=100−{100−80}×0.40=92

The selling price calculation unit 13 rounds off the decimal portion of the result. Rounding of decimal portion can be performed, for instance, by rounding the decimal portion of the result up or down. The selling price calculation unit 13 calculates the selling price of the kinds of ballot tickets requested by the purchaser A for the quantity of ballot tickets requested by the purchaser A, based upon the request received by the request receiving unit 10 by using the calculated unit selling price, and informs the terminal TA of the calculated selling price and the discount rate.

When the purchaser A decides to purchase ballot tickets at that selling price (Step S18: Yes), the ticket issuance processing unit 14 issues ballot tickets and informs the data supplier B of the information about the issuance contents, and then terminates processing (Step S20). The accumulated purchaser number calculation unit 30 in the data supplier B calculates (updates) the accumulate number of purchasers based upon the information about the issuance contents. When the purchaser A decides not to purchase at that selling price (Step S18: No), the ticket issuance processing unit 14 does not issue ballot tickets and terminates processing. Finally, at the specified date and time of stopping sales of ballot tickets that is stored in the discount DB 20, the request receiving unit 10 stops the receipt of the request for purchasing ballot tickets.

Figure 5:
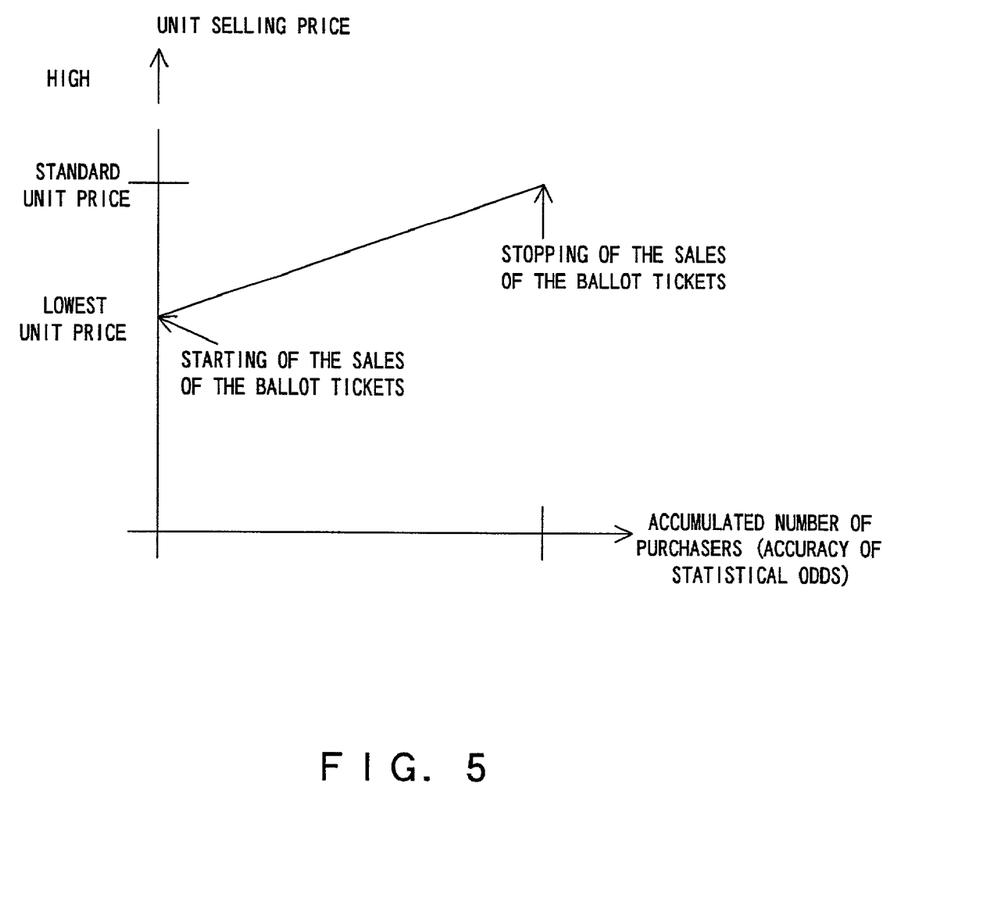
FIG. 5 is a diagram showing the relationship between the accumulated number of purchasers and the unit selling price of the ballot ticket.

FIG. 5 shows the relationships between the accumulated number of purchasers and the unit selling price. In FIG. 5 the horizontal axis indicates the accumulated number of purchasers and the vertical axis indicates unit selling price. The selling price starts from the lowest price, and after the time of starting sales of ballot tickets it rises in accordance with the increase of accumulated number of purchasers, and it reaches the standard unit price at about the time when the accumulated number of purchasers reaches the predicted number of purchasers, specifically at about the time of stopping sales of ballot tickets. In other words, the unit selling price gradually decreases on the basis of the time of stopping sales of ballot tickets, and the lowest unit selling price is at the time of starting sales of ballot tickets. From FIG. 5, according to the embodiment, based upon an empirical rule stating that the accuracy of the statistical odds is proportional to the accumulated number of purchasers, it is found that the fewer the accumulated number of purchasers, i.e. the less accurate of the statistical odds, makes the selling price of ballot tickets become lower than the unit selling price.

Figure 6:
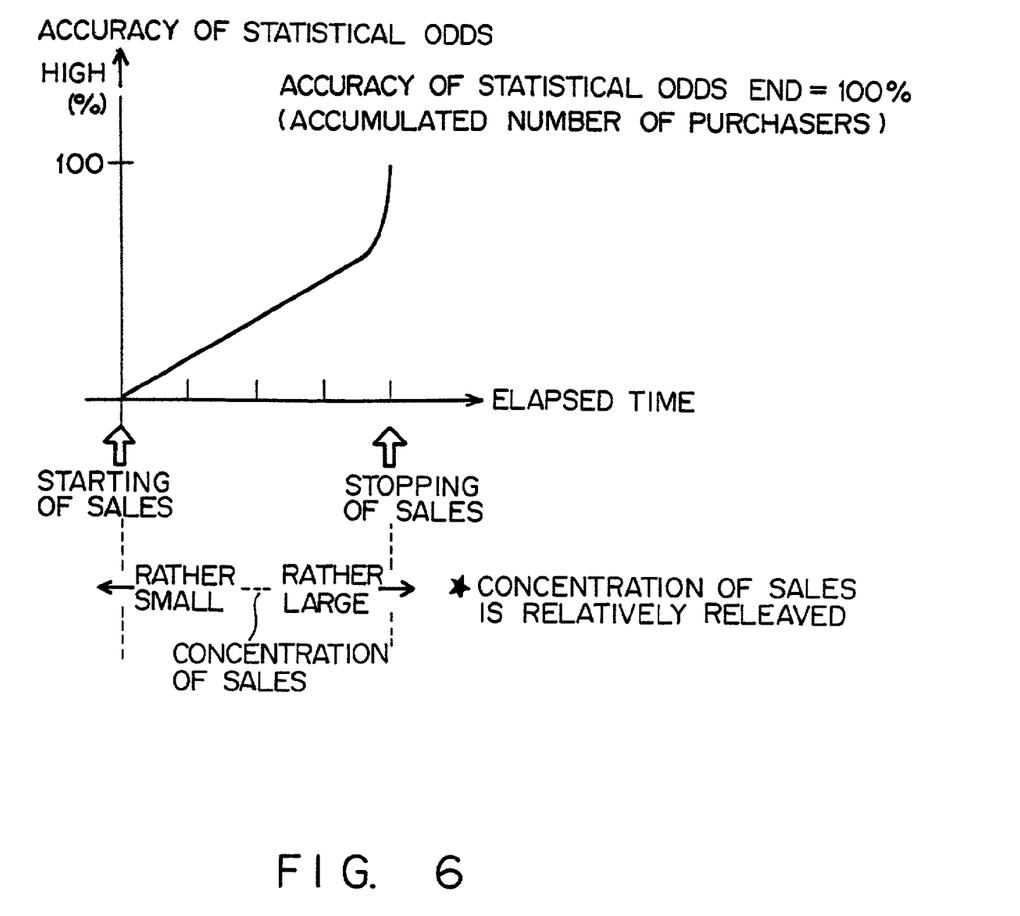
FIG. 6 is a diagram showing the relationship between time and the accuracy of the statistical odds after the present invention is applied.

FIG. 6 is a diagram showing the relationship between time, after the present invention is applied, and accuracy of the statistical odds. The horizontal axis indicates time and the vertical axis indicates accuracy of the statistical odds. The accuracy of the statistical odds is zero at the time the sales of ballot tickets are started, and gradually becomes higher with the passage of time, and becomes 100% at the time the sales of ballot tickets are stopped, as shown in FIG. 6. It can be seen in FIG. 6 that the accuracy of the statistical odds becomes sharply high at about the time before stopping the sales of ballot tickets, but the accuracy of the statistical odds reaches a certain level before it becomes sharply high.

Figure 7:
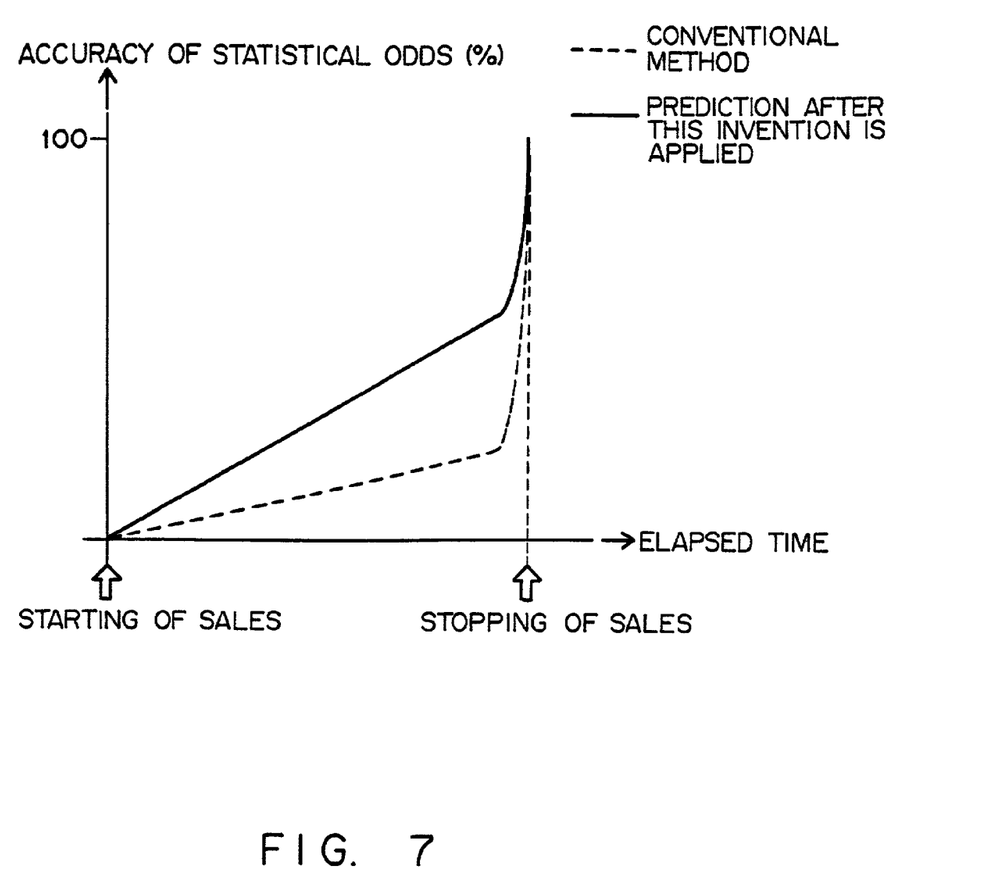
FIG. 7 is a diagram showing the relationship between time and accuracy of the statistical odds, which are compared an applied conventional method and the applied present invention.

FIG. 7 shows the relationship between time and the accuracy of the statistical odds, for which a comparison is made between an applied conventional method and the applied present invention. The horizontal axis and the vertical axis are the same as those of FIG. 6. The conventional method is graphed using a dotted line and the present invention is graphed using a solid line. In the conventional method, the purchase of ballot tickets becomes concentrated at the time near to stopping sales of ballot tickets, so the accuracy of the statistical odds sharply increases around that time. However, after the present invention is applied, the accuracy of the statistical odds at a rate greater than the conventional method during a period from the time of starting sales of ballot tickets to near the time of stopping sales of ballot tickets. When the present invention is applied, the lower the accuracy of statistical odds, which occurs at a time ballot tickets are sold near to the starting of sales of ballot tickets, the lower the unit selling price, resulting in that the number of the purchasers who purchase ballot tickets at a comparatively early time becomes larger than that in the conventional method. It is understandable, therefore, that the concentration of the sales of ballot tickets at the time near to stopping sales is reduced to a much greater extent than in the conventional method.

Figure 8:
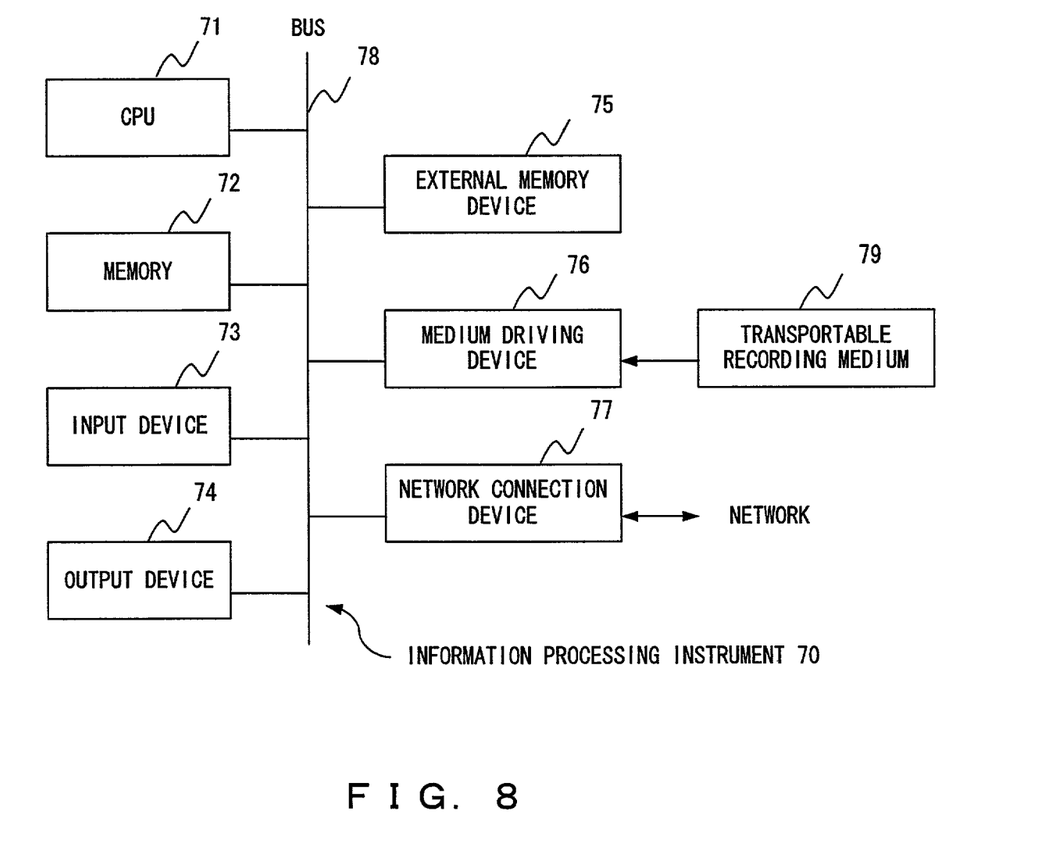
FIG. 8 is a block diagram of the information processing device.

The terminal TA, the data supplier B and the selling price calculation apparatus C, which are described in the embodiment according to the present invention, can be composed using an information processing device (computer), as shown in FIG. 8. The information processing device 70 in FIG. 8 is composed of a CPU 71, memory 72, input device 73, output device 74, external memory device 75, medium driving device 76 and network connection device 77, all of which are connected to one another by a bus 78.

The memory 72 includes, for example, ROM (Read Only Memory) and RAM (Random Access Memory) and stores the program and data used for processing. The CPU 71 performs a necessary process by executing the program using the memory 72.

Each unit that compose the selling price calculation apparatus C, the terminal TA and the data supplier B are stored in each particular program code segment of the memory 72 as a program. The input device 73 comprises, for example, a keyboard, a pointing device, or a touch panel, and it is used to input instructions and information from the user. The output device 74 comprises, for example, a display and a printer, and it is used to query the user of the information processing device 70 and to output the processing results.

The external memory device 75 comprises, for example, a magnetic disk device, an optical disc device and a magneto-optical disc. The above-mentioned program and data are stored in this external memory device 75, and they can be used by loading them into the memory 72 as needed.

The medium driving device 76 drives the transportable recording medium 79 and accesses the contents of the record. Used for the transportable recording medium 79 is a random computer readable recording medium such as memory card, memory stick, floppy disc, CD-ROM (Compact Disc Read Only Memory), optical disc, magneto-optical disc and DVD (Digital Versatile Disc). The above-mentioned program and data are stored in this transportable recording medium 79 and they can be used by loading them into the memory 72 as needed.

The network connection device 77 communicates with external devices via an optional network (line) such as LAN and WAN and converts the data pertaining to communication. The network connection device 77 also receives the above-mentioned program and data from external devices as needed, and they can be used by loading them into the memory 72.

Figure 9:
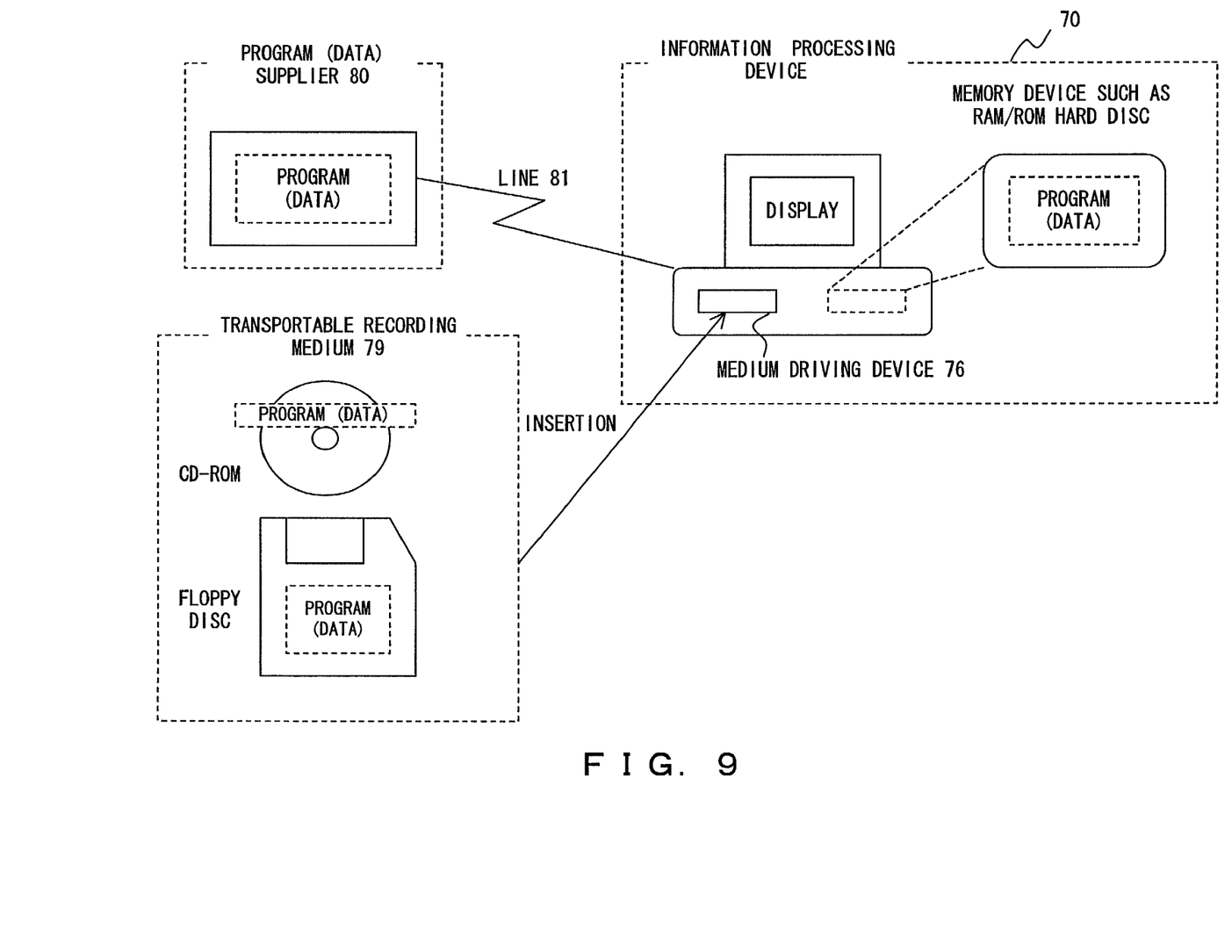
FIG. 9 is a diagram showing the recording medium that can be read by a computer, the transmission signal and the transmission medium that can supply a program and data to the information processing device.

FIG. 9 shows the computer readable recording medium, transmission signals and transmission medium that can supply the program and data to the information processing device shown in FIG. 8. The function corresponding to the selling price calculation apparatus C described in the above-mentioned embodiment according to the present invention can be executed by a general-purpose computer. To do so, the following operation is performed. The program shown in the flowchart of FIG. 4 that executes the same processes as the one executed by the selling price calculation apparatus C is stored in advance in the computer readable recording medium 79; the computer 70 reads said program from the recording medium 79; said program is once stored in the memory 72 and the external memory device 75 for the computer 70; said program stored in the CPU 71 of the computer 70 is read and executed.

The transmission signal itself that is transmitted via the line 81 (transmission medium) when the program is downloaded to the computer 70 from the program (data) supplier (provider) 80 as well as the function corresponding to the selling price calculation apparatus C described in the embodiment according to the present invention can both be executed by a general-purpose computer.

The embodiment according to the present invention has been explained. Please note that this invention is not limited to the above-mentioned mode, and it can be modified in various ways. For instance, it is explained in the above-mentioned description that the data supplier B has the accumulated purchaser number calculation unit 30, but the accumulated purchaser number calculation unit 30 can be provided in the selling price calculation apparatus C.

It is also explained in the above description that the discount rate calculation unit 12 calculates the discount rate based upon the accuracy of statistical odds. Instead, it is possible to change this as follows. The discount rate calculation unit 12 calculates the discount rate based upon the accuracy of statistical odds and the time of ballot tickets sales. To be more specific, for instance, the discount rate calculation unit 12 calculates the discount rate based upon the accuracy of statistical odds up to 5 minutes before the stopping time of the sales of ballot tickets, but can make the discount rate zero within the 5 minutes period before the stopping time of the sales (that is, the selling price is not discounted).

It is also explained in the above description that the discount rate calculation unit 12 calculates the discount rate as a linear function of the accuracy of statistical odds, but the said linear function can be a quadratic function or any other function. In addition, the discount rate can be changed step by step. For example, when the accuracy of statistical odds is between 0 and less than 20 percent, the discount rate is 30 percent, and when the accuracy of statistical odds is between 20 percent and less than 30 percent, the discount rate is 25 percent.

Each unit and each DB that comprise the selling price calculation apparatus C operate in concert with one another and thus realizes a series of business processes. These units and DB can be provided in the same server, or they can operate in concert with one another via a network provided to a different server. In addition, the selling price calculation apparatus C can simultaneously be the data supplier B.

As has been explained in detail, this invention makes it possible to relieve or solve such a problem that the purchase of presale ballot tickets becomes concentrated immediately before the stopping time of the sales of the ballot tickets.

While the invention has been described with reference to the preferred embodiments thereof, various modifications and changes may be made by those skilled in the art without departing from the true spirit and scope of the invention as defined by the claims thereof.

What is claimed is:

1. A selling method for selling a ballot ticket, comprising:
   receiving, by a computer, a request for a ballot ticket of a race from a terminal;
   acquiring ticket sales information about the race by referring to a database using an identification information of the race as a search key;
   calculating a discount rate according to both an accumulated number of purchasers of the ballot ticket and a predicted number of purchasers of the ballot ticket stored in the database;
   calculating the selling price of the ballot ticket based upon a standard unit price of the ballot ticket and the calculated discount rate; and
   issuing the ballot ticket.

2. The method described in claim 1, further comprising: lowering the discount rate gradually until the sales of the ballot ticket is terminated.

3. A selling price acquisition method for acquiring a selling price of a racing ballot ticket, comprising:
   transmitting identification information to identify a race;
   receiving the selling price of the ballot ticket of the identified race, the selling price of the ballot ticket being calculated based upon a standard unit price of the ballot ticket and a discount rate, the discount rate being calculated according to both an accumulated number of purchasers of the ballot ticket and a predicted number of purchasers of the ballot ticket stored in the data base; and
   outputting the received selling price of the ballot ticket.

4. A computer readable recording medium which records a program to make a computer perform the control for calculating a selling price of a racing ballot ticket, the program to make said computer perform the processes of:
   calculating a discount rate based upon both an accumulated number of purchasers of the racing ballot ticket and a predicted number of purchasers of the racing ballot ticket;
   calculating the selling price of the racing ballot ticket based upon a standard unit price of the ballot ticket and the calculated discount rate; and
   outputting the calculated selling price of the racing ballot ticket.

5. A computer readable recording medium which records a program to make a computer perform the control for acquiring a selling price of a racing ballot ticket, the program to make said computer perform the processes of:
   transmitting identification information to identify a race;
   receiving the selling price of the ballot ticket of the identified race, the selling price of the ballot ticket being calculated based upon a standard unit price of the ballot ticket and a discount rate, the discount rate being calculated according to both an accumulated number of purchasers of the ballot ticket and a predicted number of purchasers of the ballot ticket stored in the data base; and
   outputting the received selling price of the ballot ticket.

6. A selling price calculation apparatus that calculates a selling price of a ballot ticket, comprising:
   a discount rate calculation unit calculating a discount according to both of an accumulated number of purchasers of the ballot ticket and a predicted number of purchasers of the ballot ticket; and
   a selling price calculation unit calculating the selling price of the ballot ticket based upon a standard unit price of the ballot ticket and the discount rate.

7. A method of selling a racing ticket, comprising:
   calculating a discount responsive to a number of racing tickets sold and a predicted number of racing tickets to be sold;
   setting, using a computer, a selling price for the racing ticket based upon a standard unit price of the racing ticket and responsive to the discount; and
   outputting the set selling price of the racing ticket.

* * * * *